C. HEIDEMANN.
VEHICLE SIGNAL.
APPLICATION FILED APR. 20, 1914.
1,163,918. Patented Dec. 14, 1915.
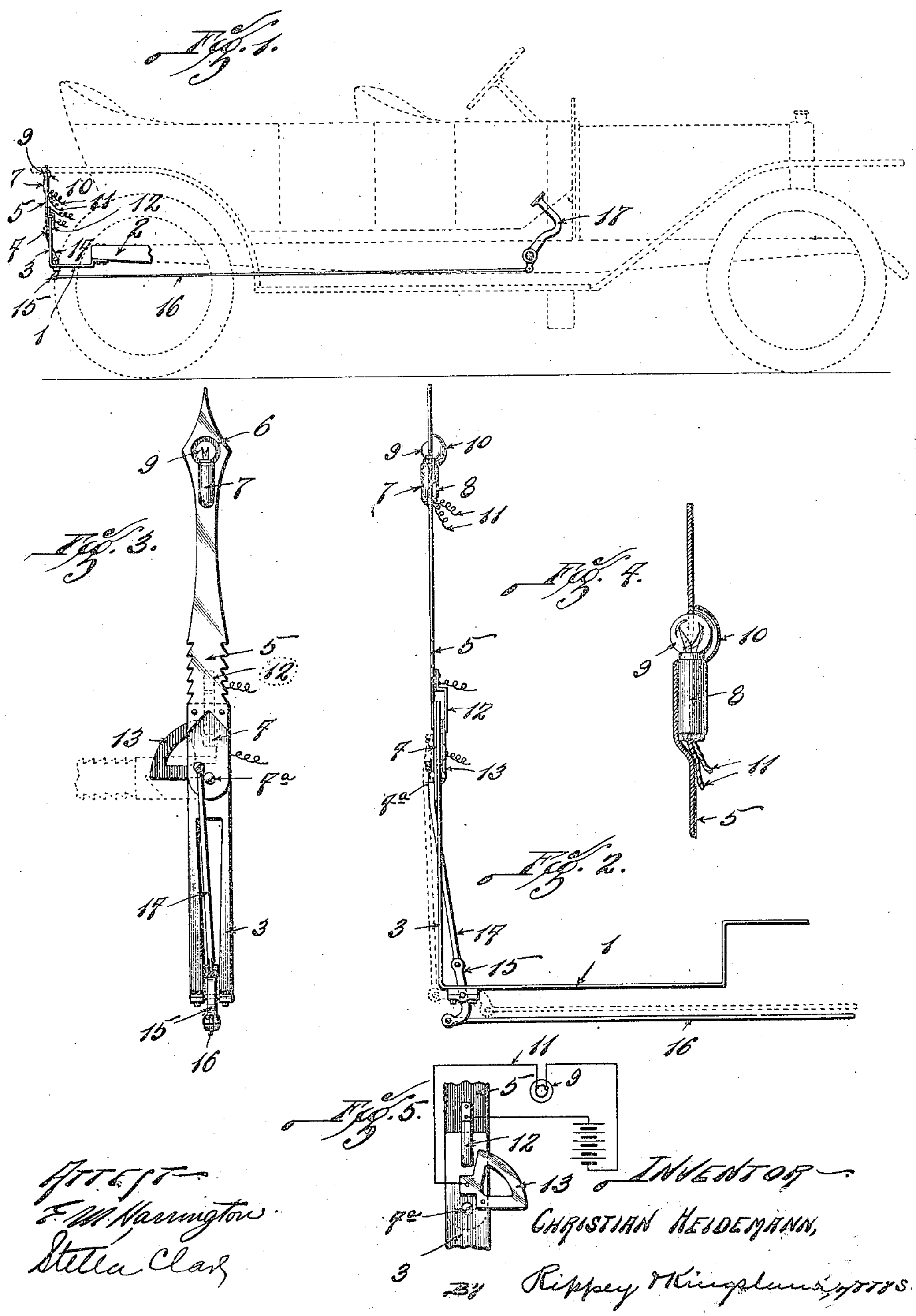

UNITED STATES PATENT OFFICE.

CHRISTIAN HEIDEMANN, OF ST. LOUIS, MISSOURI.

VEHICLE-SIGNAL.

1,163,918. Specification of Letters Patent. Patented Dec. 14, 1915.

Application filed April 20, 1914. Serial No. 833,021.

*To all whom it may concern:*

Be it known that I, CHRISTIAN HEIDEMANN, a citizen of the United States, residing in the city of St. Louis and State of Missouri, have invented a new and useful Vehicle-Signal, of which the following is a specification.

This invention relates to vehicle signals, such as signals for automobiles, to indicate the fact that the vehicle is about to stop or the speed thereof reduced.

An object of the invention is to provide a signal device including an electrically controlled lamp which may be conveniently attached to an automobile and which is controlled through connections operated by any of the controlling levers of the automobile, so that when the speed of the vehicle is reduced or the same is about to be brought to a stop the lamp will be lighted and the signal arm moved to indicate the fact that the speed of travel of the vehicle has been changed.

Another object of the invention is to provide a signal of novel and ornamental construction and design including an electrical indicating device which is controlled incidentally to the movement of the signal arm in which it is supported incident to the reduction of speed of the vehicle by the operation of controlling devices for the vehicle.

Other objects will appear from the following description, reference being made to the accompanying drawing in which I have illustrated one embodiment of the invention, and in which—

Figure 1 is a side elevation of the signal in its relation to an automobile to which it is attached. Fig. 2 is a side elevation of the signal device removed from the automobile, this view being enlarged with respect to Fig. 1. Fig. 3 is a rear elevation of the signal device in its normal or idle position. Fig. 4 is a sectional view of a part of the signal arm, illustrating the relation of the lamp to the reflector. Fig. 5 is a detail view illustrating the arrangement by which the lamp is lighted as an incident to the operation of the signal.

The signal includes a bracket, having a horizontal arm 1 attached to a part 2 of the automobile, and a vertical arm 3 which extends upwardly at the rear of the tonneau. A supporting plate 4 is supported on a pivot 4ª near the upper extremity of the vertical arm 2, and is movable from a vertical position to a horizontal position, the normal or idle position thereof being vertical—that is the plate is held vertically when the automobile is under power. An ornamental signal arm 5, which may be in the form of an arrow as illustrated, or in any other preferred form, is attached to the plate 4, and is movable thereby from its normal or idle position, which is vertical, to a signaling position, which is horizontal.

The signal arm 5 is provided with an opening 6 near its upper end, and with a socket supporting portion 7 below said opening. A lamp socket 8 is supported in the portion 7 and carries an electric lamp bulb 9 the illumination of which is plainly visible from the rear because of the opening 6 in which the lamp is mounted. A reflector 10 is attached to the signal arm 5, and is between the lamp and the tonneau of the automobile so that there will be a strong reflection of the illumination toward the rear. The circuit wires 11 lead from the usual terminals in the socket 8, one of said wires leading to the battery, and the other leading to a switch member 12 which is secured to the signal arm 5 adjacent to the upper end of the vertical bracket arm 3. The switch member 12 is angular in form, and extends in front of the upper portion of the arm 3 adjacent to another switch member 13 which is attached to the said arm 3. One of the wires 11 from the battery leads to the member 13, so that the circuit is closed and the lamp illuminated when the member 12 contacts with the member 13. Normally the member 12 is out of contact with the member 13, so that the lamp remains out of circuit and, consequently, is not illuminated so long as signal arm 5 is retained in its vertical position. When the signal arm is turned toward horizontal position the member 12 contacts with the member 13, thereby completing the circuit and lighting the lamp. The arrangement is such that the contact is effected after very slight movement of the signal arm, so that the lamp will be lighted while moving, and will thus be a moving light, and hence a more effective signal.

The operation of the signal including the lighting and extinguishing of the lamp may be controlled by connections actuated by any of the usual operating levers accessible to the operator of the vehicle. In the embodiment illustrated in the drawing I have shown an arrangement in which the control of the signal is effected by suitable connections leading to the clutch mechanism. In the form illustrated there is a rod 14 having its upper end pivoted to the plate 4 laterally from the pivot 5, so that said plate 4, and thereby the signal arm 5, may be operated from vertical to horizontal position and vice versa, by said rod. The lower end of the rod 14 is pivoted to the upper end of a lever 15 pivotally supported by the horizontal arm 1 of the bracket. A rod 16 has its rear end pivoted to the lower end of the lever 15, and its forward end pivoted to the clutch controlling lever 17. The mechanism beyond the lever 17 is unimportant, it being understood that said mechanism is controlled by the lever 17 in the usual manner, and by the usual mechanism.

When the clutch is closed, and the automobile is running, the signal arm 5 is supported vertically, but when the lever 17 is operated to open the clutch the signal arm is automatically moved toward horizontal position, being illuminated immediately after starting and remaining lighted until it is again placed in vertical position by the closing of the clutch by operation of the lever 17.

What I claim and desire to secure by Letters Patent is:

A vehicle signal, comprising a horizontal arm and a vertical arm supported thereby, a movable arm pivotally supported by said vertical arm, a socket support on said movable arm near the free end thereof, a lamp having a socket seated in said socket support, a reflector carried by said movable arm near the free end thereof adjacent to said lamp, a lever supported by said horizontal arm, a connection between said lever and said movable arm, means for holding said lever in position to retain said movable arm in an upright position with its free end above the pivot of said movable arm, a segmental contact plate secured to said vertical arm, a downwardly extending contact plate secured to said movable arm and being out of contact with said segmental plate when said movable arm is in the upright position, aforesaid, and being arranged to contact with said segmental plate when said movable arm moves toward the horizontal position, and wires connecting said lamp with said plates respectively, whereby said lamp will be lighted when said plates are in contact.

In witness whereof, I have signed this specification in the presence of two subscribing witnesses.

CHRISTIAN HEIDEMANN.

Witnesses:
GEO. C. COOK,
JOHN D. RIPPEY.